(12) United States Patent
Wang et al.

(10) Patent No.: US 7,954,014 B2
(45) Date of Patent: May 31, 2011

(54) HEALTH CHECK FRAMEWORK FOR ENTERPRISE SYSTEMS

(75) Inventors: Chongyao Wang, Shanghai (CN); Yang Zhao, Shanghai (CN)

(73) Assignee: SAP AG, Walldorf (DE)

( * ) Notice: Subject to any disclaimer, the term of this patent is extended or adjusted under 35 U.S.C. 154(b) by 561 days.

(21) Appl. No.: 11/857,387

(22) Filed: Sep. 18, 2007

(65) Prior Publication Data
US 2009/0077424 A1     Mar. 19, 2009

(51) Int. Cl.
*G06F 11/00*     (2006.01)
(52) U.S. Cl. .................................................. 714/47
(58) Field of Classification Search .................. 714/26, 714/27, 33, 37–39, 45–50, 57
See application file for complete search history.

(56) References Cited

U.S. PATENT DOCUMENTS

| | | | |
|---|---|---|---|
| 6,467,052 B1 * | 10/2002 | Kaler et al. | 714/39 |
| 6,691,254 B2 * | 2/2004 | Kaler et al. | 714/39 |
| 7,243,265 B1 * | 7/2007 | Wookey et al. | 714/37 |
| 2003/0061541 A1 * | 3/2003 | Kaler et al. | 714/37 |
| 2003/0204588 A1 * | 10/2003 | Peebles et al. | 709/224 |
| 2003/0204781 A1 * | 10/2003 | Peebles et al. | 714/25 |
| 2003/0204789 A1 * | 10/2003 | Peebles et al. | 714/47 |
| 2003/0212928 A1 * | 11/2003 | Srivastava et al. | 714/47 |
| 2005/0283348 A1 * | 12/2005 | Tsui et al. | 703/13 |
| 2006/0149993 A1 * | 7/2006 | Srivastava et al. | 714/4 |
| 2006/0265713 A1 * | 11/2006 | Depro et al. | 718/104 |
| 2007/0067678 A1 * | 3/2007 | Hosek et al. | 714/25 |
| 2007/0174716 A1 | 7/2007 | Erdtmann et al. | |

* cited by examiner

*Primary Examiner* — Nadeem Iqbal
(74) *Attorney, Agent, or Firm* — Mintz Levin Cohn Ferris Glovsky and Popeo, P.C.

(57) ABSTRACT

A health check framework for enterprise systems is described herein. In one embodiment, a health check framework includes one or more first layer methods as public interfaces to allow an application client to initiate one or more stages of a health checking session, where the first layer methods are independent of a particular component of the enterprise system. The health check framework further includes one or more second layer methods to provide an abstract interface to the one or more system and/or application components with respect to the one or more first layer methods. The second layer methods include one or more methods that are specific to a corresponding one of the system and/or application components of the enterprise system. During a health check session, the first layer methods invoke the second layer methods to perform health check operations. Other methods and apparatuses are also described.

20 Claims, 16 Drawing Sheets

Health Check Configuration

Please select on which level of detail your system should be monitored, for an explanation of the different levels please refer to the documentation / help.

[Edit]

Configuration Template: Standard ▼
Coming Maintenance Period: No Planned maintenance period | Set Maintenance period

Checks | Thresholds

| Active | Check Description | Exceptions | Priority of Generated Event | Frequency | Auto Action | Last Changed On | Last Changed By |
|---|---|---|---|---|---|---|---|
| ▶ ☐ | ABAP Engine | | | | | | |
| ■ ☑ | Enqueue Errors | | Immediate | Hourly | | 14-12-2006 | SAP |
| ■ ☑ | Update Errors | Exceptions | Immediate | Hourly | | 14-12-2006 | SAP |
| ■ ☑ | Short Dumps | | Low | Hourly | | 14-12-2006 | SAP |
| ■ ☑ | System Log | Exceptions | Normal | Hourly | | 25-02-2006 | SAP |
| ■ ☑ | Cancelled Jobs | Exceptions | Low | Hourly | | 14-12-2006 | SAP |
| ■ ☐ | Communication Errors - Gateway Reader | | Urgent | Hourly | | 14-12-2006 | SAP |
| ■ ☐ | Communication Errors - ARFCSSTATE: Outbound tRFC Calls | | Urgent | Hourly | | 14-12-2006 | SAP |
| ■ ☐ | Communication Errors - ARFCSSTATE: Inbound tRFC/qRFC Calls | | Urgent | Hourly | | 14-12-2006 | SAP |
| ■ ☐ | TRFC InQueue Error | | Urgent | Ten Minutes | | 14-12-2006 | SAP |

Batch Job Status: Scheduled | Refresh
Auto-forward to Service Desk: ☐ Incidents ☐ Tasks
Last Changed On: Fri Aug 17 07:19:25 CEST 2007
Last Changed By: C5094027

[Edit]

FIG. 10A

Health Check Configuration

Please select on which level of detail your system should be monitored, for an explanation of the different levels please refer to the documentation / help.

Edit

Configuration Template: Standard ▶
Coming Maintenance Period: No Planned maintenance period | Set Maintenance period Checks / Thresholds

| Threshold | Object | *Value For Creation | *Value For Closure | Unit | Last Changed On | Last Changed By |
|---|---|---|---|---|---|---|
| ▼ ABAP Engine | | | | | | |
| ▪ ErrorFreqInWpENQ | | 0.0 | 1.0 | | 25-02-2006 | SAP |
| ▪ ErrorsInWpENQ | | 0.0 | 1.0 | | 25-02-2006 | SAP |
| ▪ The first lines of MDRO application log | | 20.0 | | | 12-07-2007 | SAP |
| ▪ Number of inbound calls | | 2000.0 | 900.0 | | 25-02-2006 | SAP |
| ▪ Number of documents in send queue | | 500.0 | 400.0 | | 25-02-2006 | SAP |
| ▪ Dump frequency | | 100.0 | 100.0 | /last hour | 09-02-2007 | SAP |
| ▪ Number for jobs in the queue | | 4.0 | 4.0 | Jobs | 09-02-2007 | SAP |
| ▪ Usage of gateway clients on server | | 60.0 | 60.0 | % | 18-03-2007 | SAP |
| ▪ Usage of Gateway connections on server | | 60.0 | 60.0 | % | 18-03-2007 | SAP |

Batch Job Status: Scheduled | Refresh
Auto-forward to Service Desk: ☐ Incidents ☐ Tasks
Last Changed On: Fri Aug 17 07:19:25 CEST 2007
Last Changed By: C5094027

Edit

FIG. 10B

```
┌─────────────────────────────────────────────────────────────────────────────────┐
│ 🔷 SAP NetWeaver Portal - Microsoft Internet Explorer                  ▬ ▣ ☒  │
│ Q1M: Technical report /ITSAM/SLL_START_SERVICE without c...  Personalize  Help │
│ Event ID      Q1M0000038004              Check Group  MDROs and Technical Reports  Check         Technical Report Check │
│ SPR ID        00300571C129DDC8FCEB7D7F9A946CF  Status  Forwarded              Priority      Urgent │
│ Creation Date Mon Jul 30 10:17:42 CEST 2007  Last Updated Fri Aug 17 06:11:54 CEST 2007  Last Changed By  GLOSER │
│                                                                                 │
│ [Set Status to Closed] [Execute Recommended Action] [Create Incident]           │
│                                                                                 │
│ Diagnostic Information                                                          │
│                                                                                 │
│ Health Check Component: MDROs and Technical Reports                             │
│ Health Check Name: Technical Report Check                                       │
│ Message: Technical report without corresponding job entry found                 │
│                                                                                 │
│                                                                                 │
│ Please note:                                                                    │
│ The current version of the Description and/or Recommended Action is not available. This is the backup version. │
│ Description                                                                     │
│                                                                                 │
│ Checking the consistency of technical reports and job scheduling an inconsistency was found. A technical report had not been correctly scheduled. The report may have │
│ been scheduled in the system but not in correct start condition or periodicity. │
│                                                                                 │
│ Recommend Action                                                                │
│                                                                                 │
│ Reschedule the technical report according to the error information using T-code SM36. │
│                                                                                 │
│ Error Information                                                               │
│                                                                                 │
│ Technical report name: /ITSAM/SLL_START_SERVICE                                 │
│ Technical report variant: SAP&KTCUSTRDY                                         │
│ Sequence number: 0001                                                           │
│ Job name: WEKTRA_CUSTOMER_READINESS_WEEKLY                                      │
│ Job class: C                                                                    │
│ Job start date: 20070820                                                        │
│ Job start time: 000001                                                          │
│ Periodicity months: 0                                                           │
│ Periodicity weeks: 1                                                            │
│ Periodicity days: 0                                                             │
│ Periodicity hours: 0                                                            │
│ Periodicity minutes: 0                                                          │
│                                                                                 │
│ Context Information                                                             │
│                                                                                 │
│ System: Q1M                                                                     │
│ Instance: Q1M                                                                   │
│ Check Group: ITSAM_JOBSCHED                                                     │
│ Check ID: 00002                                                                 │
│ Check Context: R3_SYSTEM                                                        │
│                                                                                 │
│ [Set Status to Closed] [Execute Recommended Action] [Create Incident]           │
└─────────────────────────────────────────────────────────────────────────────────┘
```

FIG. 11

Health Check Events

| Show By Status | Forwarded ▼ | Event Type | Incident & Task ▼ | Open | Clean Up | Refresh | Set Status to Closed | Relaunch all health checks |

| Type | Status | Subject | Category | Last Updated Time | Priority |
|---|---|---|---|---|---|
| Task | Forwarded | Q1M: liveCache Data Collectors disabled: Health Cheeck cannot run CCMS data unavailable | System self monitoring issue | Fri Aug 17 06:16:52 CEST 2007 | Immediate |
| Task | Forwarded | Q1M: TREX monitoring identified errors with health check | TREX issue | Fri Aug 17 06:16:51 CEST 2007 | Urgent |
| Incident | Forwarded | Q1M: Error in defaultTrace.trc | Frontend server issue | Fri Aug 17 06:16:50 CEST 2007 | Immediate |
| Incident | Forwarded | Q1M: Error in the application log file | Frontend server issue | Fri Aug 17 06:16:42 CEST 2007 | Immediate |
| Task | Forwarded | Q1M: J2EE Table Buffer Monitor: hit rate: Health Check cannot run: CCMS data unavailable | System self monitoring issue | Fri Aug 17 06:16:30 CEST 2007 | Urgent |
| Incident | Forwarded | Q1M: Error in SAP J2EE engine server log | J2EE engine issue | Fri Aug 17 06:16:30 CEST 2007 | Immediate |
| Incident | Forwarded | Q1M: Error in defaultTrace.trc | Frontend server issue | Fri Aug 17 06:16:19 CEST 2007 | Immediate |
| Incident | Forwarded | Q1M: Error in the application log file | Frontend server issue | Fri Aug 17 06:16:13 CEST 2007 | Immediate |
| Task | Forwarded | Q1M: J2EE Table Buffer Monitor: hit rate: Health Check cannot run: CCMS data unavailable | System self monitoring issue | Fri Aug 17 06:16:02 CEST 2007 | Urgent |
| Incident | Forwarded | Q1M: Error in SAP J2EE engine server log | J2EE engine issue | Fri Aug 17 06:16:02 CEST 2007 | Immediate |

FIG. 12

HEALTH CHECK FRAMEWORK FOR ENTERPRISE SYSTEMS

COPYRIGHT NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to enterprise computing. More particularly, this invention relates to a health check framework for enterprise systems.

BACKGROUND

Conventional IT (information technology) systems require considerable time, effort, knowledge and experience in order to implement, monitor and operate on a day-to-day basis. Even large IT departments often become lost in a maze of complex tools and technologies and thousands of pages of administration guides that are usually necessary to operate and maintain the components of such IT systems. Moreover, IT departments, in particular IT administrators, are overwhelmed with various day-to-day reactive support tasks and often have limited resources and operating budgets to handle those support tasks, which typically include normal system management activities, such as manually monitoring, checking and clearing log files, performing patches and updates, executing backup and recovery procedures, and user management, and managing and assisting end users, such as processing service requests and supporting end users having trouble with the customer's systems.

The task of manually monitoring each component of the IT system to ensure the health of the system is particularly difficult for many IT departments. Not only is this task time consuming, but also it requires significant IT resources to complete. Moreover, the practice of manually monitoring the system can be complicated and error prone. Further there has been a lack of efficient ways for developing and/or maintaining functionalities of monitoring components of the IT system.

SUMMARY OF THE DESCRIPTION

A health check framework for enterprise systems is described herein. In one embodiment, a health check framework includes one or more first layer methods as public interfaces to allow an application client to initiate one or more stages of a health checking session, where the first layer methods are independent of a particular component of the enterprise system. The health check framework further includes one or more second layer methods to provide an abstract interface to the one or more system and/or application components with respect to the one or more first layer methods. The second layer methods include one or more methods that are specific to a corresponding one of the system and/or application components of the enterprise system. In response to a health check session initiated from the application client, the first layer methods invoke the second layer methods to collect data from the one or more system and/or application components, to evaluate the collected data, and to issue a status report concerning the operating health of the one or more system and/or application components of the enterprise system.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 10-12 are examples of graphical user interfaces of a health check framework according to certain embodiments of the invention.

DETAILED DESCRIPTION

A health check framework for enterprise systems is described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to certain embodiments of the invention, a health framework is provided to allow a health check client to initiate and perform a health check session on the health of system and/or application components of an enterprise system, such as, for example, an enterprise resource planning (ERP) system. The health check framework includes one or more public interfaces or methods to allow the health check client to invoke the health check framework, which may be scheduled periodically or on demand. The public methods are independent of system and application components being monitored. The public methods then invoke another layer (e.g., lower layer) of methods which are used to performed detailed specific health check operations, where this layer of methods provides abstract interfaces to the system and/or application components from the public interfaces. These methods of the lower layer may be system and/or application components specific and these methods of the lower layer may further invoke further lower layer or layers of methods to access the system and/or application components. Each of the methods in a lower layer may be encapsulated by the public interfaces and may be developed using object-oriented programming techniques, where each method may be implemented as an object. Certain methods of lower layer may inherit from a base class by overloading and/or virtualizing a base method. As a result, specific operations regarding a specific system and/or application component may be developed independently in a corresponding object or class and invoked by other methods or classes. The health check system designed in this way would be more flexible and scalable.

Figure 1:
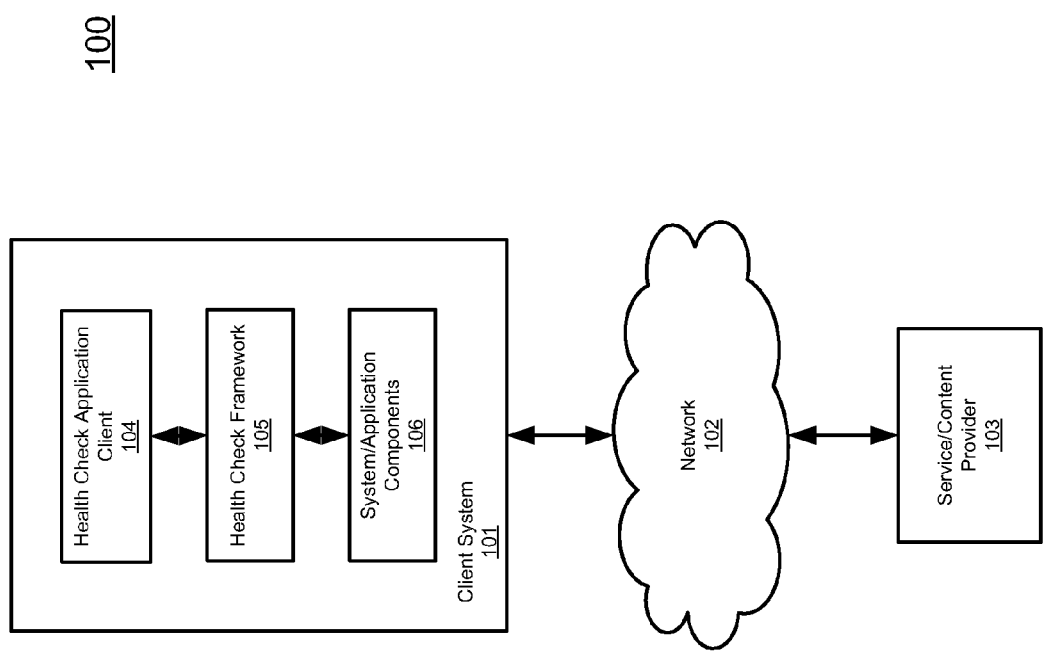
FIG. 1 is a block diagram of a health check system configuration according to one embodiment of the invention.

FIG. 1 is a block diagram of a health check system configuration according to one embodiment of the invention. Referring to FIG. 1, system 100 includes one or more client systems such as client system 101, a back-end system 103 (e.g., an application provider system and/or a service provider system), which are operatively coupled to a network 102, such as the Internet, an intranet, a local area network, an Ethernet, a wireless network, and/or a telephone network. An application provider is the provider (e.g., manufacturer) of the enterprise software. A service provider provides services for the enterprise software (e.g., user and system support, implementation service, etc.) The client systems 101 can be any systems that run software. The software can be a single application or an operating system, or a collection of software applications or software components that perform various tasks in a larger system or application, such as a business application suite, such as customer relationship management (CRM), business administration, financial, and manufacturing software.

According to one embodiment, the system 100 can utilize a health check framework 105 embedded in client systems 101, which may be initiated by a health check application client 104, to periodically or constantly monitor the system and application components 106 of the client systems 101 and create incidents and/or administration tasks if a critical situation is detected. The incidents are provided to users, such as IT administrators, with instant access to context or diagnostic information to resolve or elevate the incident. Incidents can be generated automatically after detection of a change in the system or the application components (e.g., a change in system or application component activity, a monitored performance value exceeding a pre-defined threshold, or a change in system or application component status, such as a queue overflow that stops a business process, etc.)

An incident is any event which is not part of standard operation of an IT service and which causes, or may cause, an interruption to, or a reduction in, the quality of that service (e.g., faults, errors, malfunctions, etc. of an IT service). Should such an event occur, the subject matter described herein automatically collects context or diagnostic data associated with the event, such as technical and application information, package the context data with a problem description and severity in an incident report, and generates an incident service request. An administration task is a single activity or a group of activities within the IT system that need to be performed in order to reach specific end results. Administration tasks can relate to a defined activity, such as the change of a configuration parameter. Administration tasks also can be used for incident and problem solution, prevention (i.e., the execution of regulation maintenance steps required to help keep the IT system stable), and other activities, such as configuration changes, parameterization, user creation and system restart. A simple example of an administration task is a "how-to-guide," which describes a well-defined activity step by step. A complex example of an administration task is a guided activity transaction (e.g., a wizard), which guides the user through a well-defined activity.

Client systems 101 also can include other embedded services, including but not limited to an integrated operations handbook, software maintenance management, incident processing and management (embedded support), and safeguarding. The integrated operations handbook can include automated task and incident handling and a central administration console for operational management. Each task in the integrated operations handbook is associated with specific details of handling the task, such as when the task has to be performed (event based or time based), the responsible person (role), documentation on the task, and information on the service level agreement. A guided activity transaction, e.g., a wizard, may be provided to help a user perform an administration task, which guides the user through a defined activity. The incident processing and management service (embedded support) can provide end user support for incidents created by a health check monitoring process or the user and provide end user support and automated context collection for resolving incidents created by an end user. An end user can manually create an incident through a support application, which can be invoked from any application screen to report a malfunction in the application or the user can use a support button, for example, in a self service view of a control center user interface.

Note that the system 100 is illustrated as an example and other configurations, arrangements and network topologies for system 100 are possible, including more or fewer clients and/or multiple back-end systems. In some variations, the application provider system and/or the service provider system are/is integrated with the client systems through the network, which can be configured to facilitate continuous or periodic data exchange between the systems and the client systems using known networking protocols, such as TCP/IP and HTTP. In some variations, an application provider system need not be used in system 100. Likewise, a service provider system need not be used in alternative variations of system 100.

From time to time, system configuration information associated with the client systems is transmitted to the back-end system(s). In some implementations, the back-end system(s) request(s) system configuration information from the client systems on a scheduled basis using, for example, a polling scheme. In other implementations, the client systems send information to the back-end system(s) continuously or periodically, or in response to one or more events, for example notification of an incident or administration task.

Figure 2:
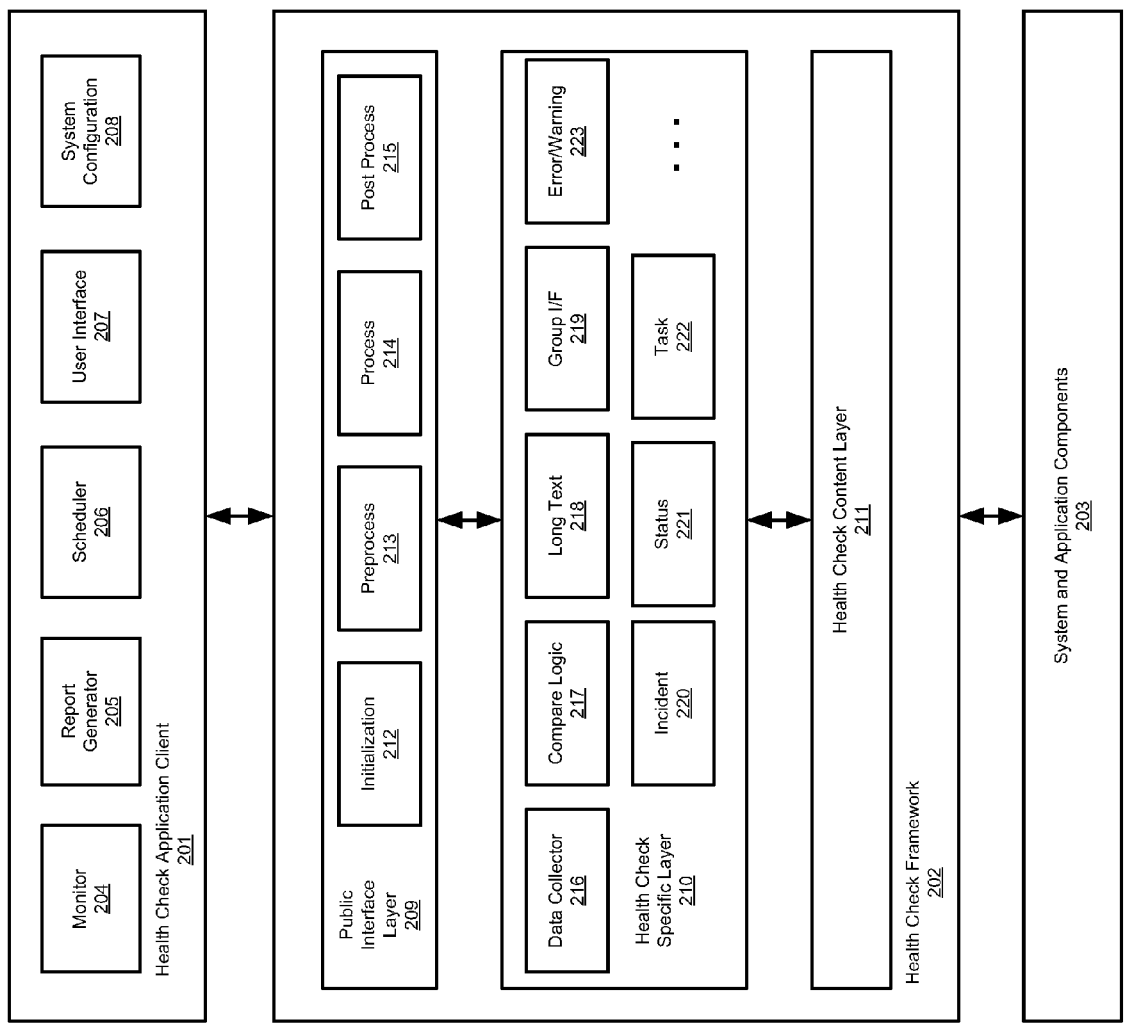
FIG. 2 is a block diagram illustrating an example of health check framework architecture according to one embodiment of the invention.

FIG. 2 is a block diagram illustrating an example of health check framework architecture according to one embodiment of the invention. Referring to FIG. 2, framework architecture 200 includes a health check application client 201 utilizes health check framework 202 to perform certain health check operations on one or more system and/or application components 203 of an enterprise system. After an operator, such as an IT administrator, configures a service level for the health check session, which may be stored as system configuration 208, the scheduler 206 dictates when the health check session is activated, unless overridden by an operator or user-initiated execution of the health check session. If the scheduler 206 has been configured to run the health check session every predetermined time period, the scheduler 206 causes the health check monitor 204 to retrieve the system configuration 208. Alternatively, the system configuration 208 may be pushed to the health check monitor 204 upon notification that the health check monitor has been initiated.

The system configuration information 208 includes system operational parameters of the system and application components, such as generated system events and performance values. The system configuration may be configured via a user interface as shown in FIGS. 10A-10B. Based on the retrieved or pushed system configuration information 208, the health check monitor 204 invokes the health check framework 202 to initiate a health check session, which utilizes a variety of methods or APIs (application programming interfaces) of the framework to perform certain health check operations. Based on the result of the health check session, report generator 205 may generate a health check report which may be presented to a user via user interface 207, as shown for example, in FIG. 11.

In one embodiment, health check framework 202 includes a variety of layers such as layers 209-211 of methods, where each method may be implemented as an object using object-oriented programming languages. For example, health check framework 202 includes a public interface layer 209 which exposes certain publicly available methods including initialization method 212, preprocess method 213, process method 214, and post-process method 215. Each of the methods 212-215 may further invoke one or more of middle layer 210 having a variety of methods that are defined in more details. While methods 212-215 are exposed to client 201, at least a portion of methods of middle layer 210 may be encapsulated and not directly accessible by client 201.

In one embodiment, middle layer 210 includes various methods each corresponding to a certain functionality (e.g., common functionalities), including data collector object 216, comparison logic 217, long text handling object 218, group interface object 219, incident handling object 220, status handling object 222, task handling object 222, and error/warning message object 223. These objects 216-223 may invoke further lower layer 211 of methods to perform operations specifically designed for the corresponding health check content.

According to certain embodiments of the invention, via object-oriented techniques (e.g., using object-oriented programming languages such as Java and/or .NET, etc.), layer 209 may be defined via a base class and methods 212-215 may be defined as common public methods of the base class (e.g., public function members) accessible by an external client or caller 201, while methods involved in layers 210-211 may be defined as encapsulated methods that are not publicly available (e.g., protected and/or private function members) and may only be accessed by the methods of layer 209.

In addition, certain methods having common functionalities may be defined at layer 209 and any specific implementation that deviates from the common methods may be defined within layers 210-211, for example, by overloading and/or virtualizing the corresponding method. For example, methods of data collector object 216 may be used frequently; however, for each of the system/application components 203, the specific way to collect such data may be different. As a result, layer 211 may include another object that inherits, overloads, and/or virtualizes at least a portion of the methods in the data collector object 216. Furthermore, as another example, status handling object 221 may invoke data collector object 216 to collect certain statuses of a system/application component as the data collector object 216 may be designed to collect any data, including status. Thus, although the API exposed to client 201 may remain the same, specific implementation of a method may be implemented or modified within layers 210-211 and may be developed by different developers in different development phases. Other configurations may exist.

Figure 3:
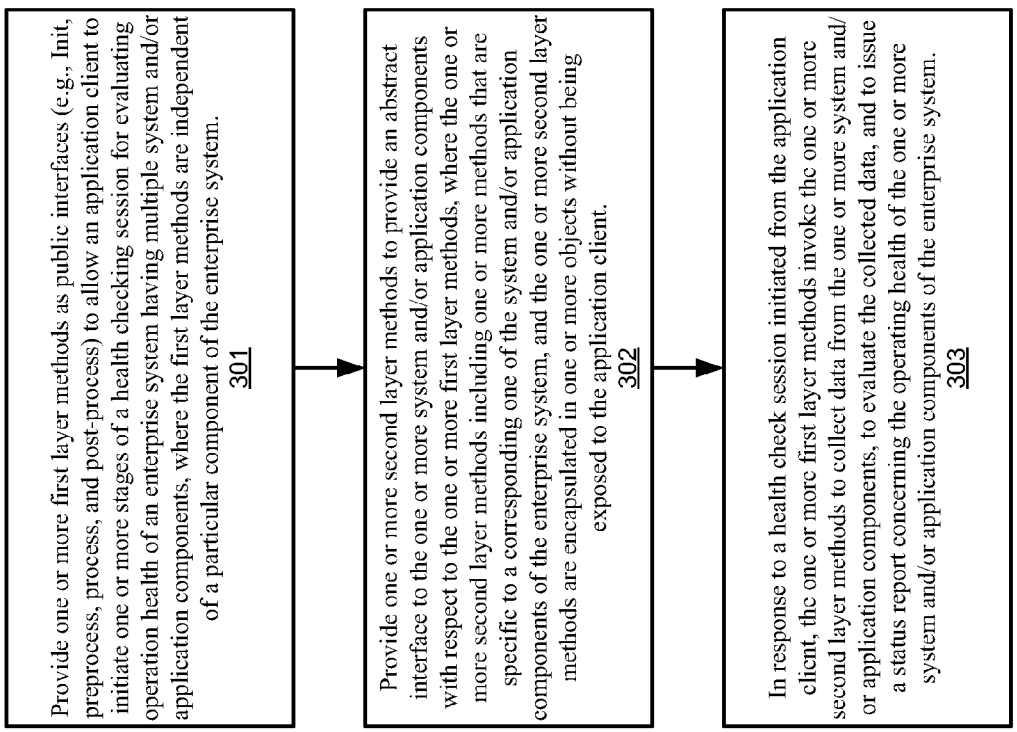
FIG. 3 is a flow diagram illustrating a process for process a health check session according to one embodiment of the invention.

FIG. 3 is a flow diagram illustrating a process for processing a health check session according to one embodiment of the invention. Note that process 300 may be performed by processing logic which may include software, hardware, or a combination of both. For example, process 300 may be performed by systems as shown in FIGS. 1-2. Referring to FIG. 3, at block 301, one or more first layer methods are defined and provided as public interfaces (e.g., initialization, preprocess, process, and post-process) to allow a client to initiate one or more stages of a health check session for evaluating operation health of an enterprise system (e.g., ERP system) having multiple system and/or application components. The first layer methods are independent of a particular system/application component of the enterprise system.

At block 302, one or more second layer methods are defined and provided to provide an abstract interface to one or more system/application components with respect to one or more first layer methods. The second layer methods include one or more methods that are specific to a corresponding one of system/application components. The second layer methods are encapsulated in one or more objects without being exposed to the client. At block 303, in response to a health check session initiated from the client, one or more first layer methods invoke at least a portion of second layer methods to collect data from one or more system/application components. The collected data is then evaluated to determine the health of the particular system/application components. Thereafter, a health report is generated based on the evaluation. Other operations may also be performed.

Figure 4A:
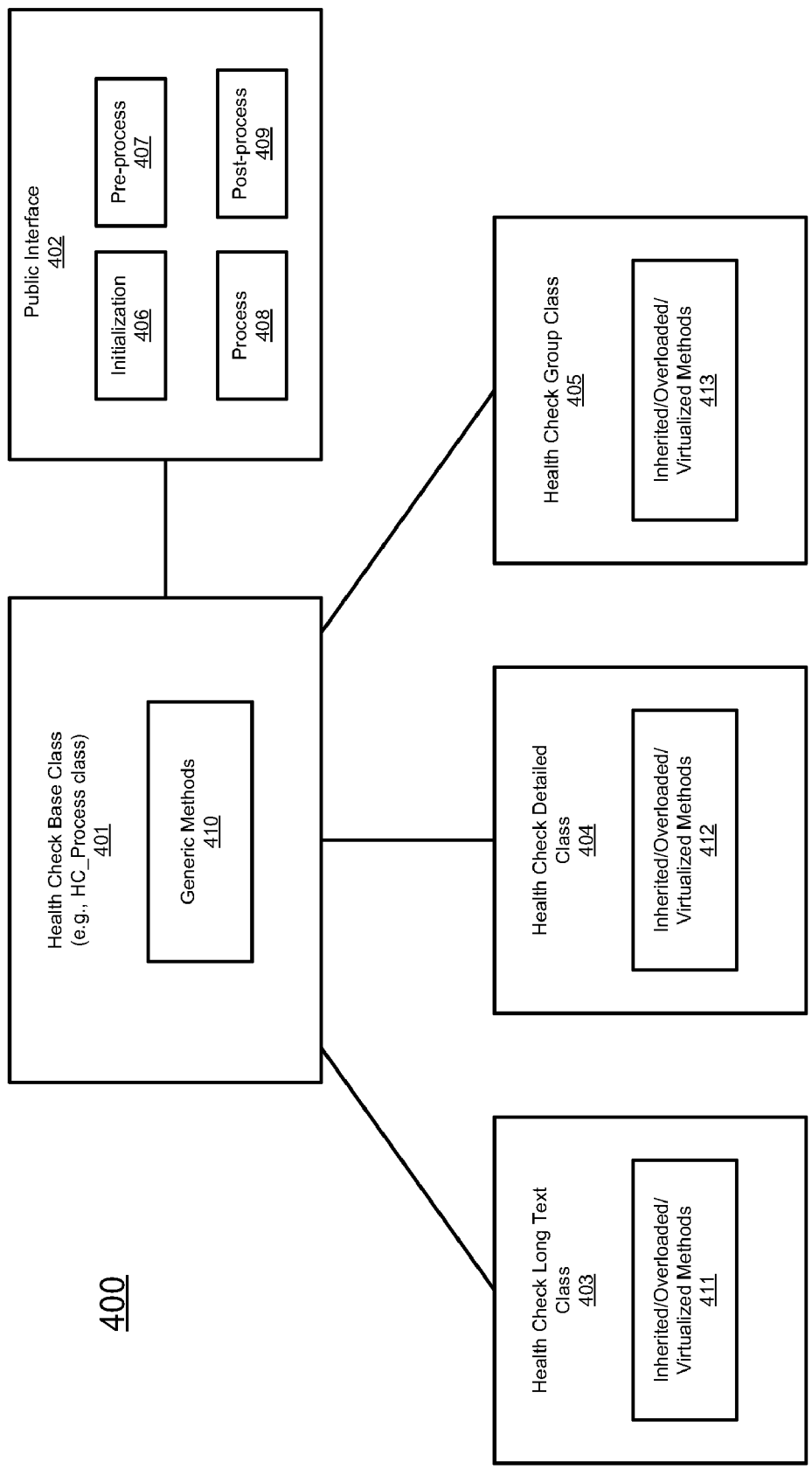
FIGS. 4A-4B are block diagrams illustrating an example of classes that define a health check framework according to one embodiment of the invention.

FIG. 4A is a block diagram illustrating an example of classes that define a health check framework according to one embodiment of the invention. Referring to FIG. 4A, architecture 400 includes a base class 401 that defines most of the generic methods 410 and a set of public interfaces 402, for example, including initialization method 406, pre-process method 407, process method 408, and post-process method 409. The methods involved in base class 401 and interface 402 may be implemented as a top layer of the framework such as layer 209 of framework 202 of FIG. 2. In addition, as an example, other classes such as class 403 for handling long texts, detail class 404 for implement specific detailed methods related to the underlying system/application components, and group class 405 for grouping certain methods having similar characteristics. These classes 403-405 may be derived from base class 401 and may inherit, overload, or virtualize certain methods 411-413 from generic or common methods 410.

Figure 4B:
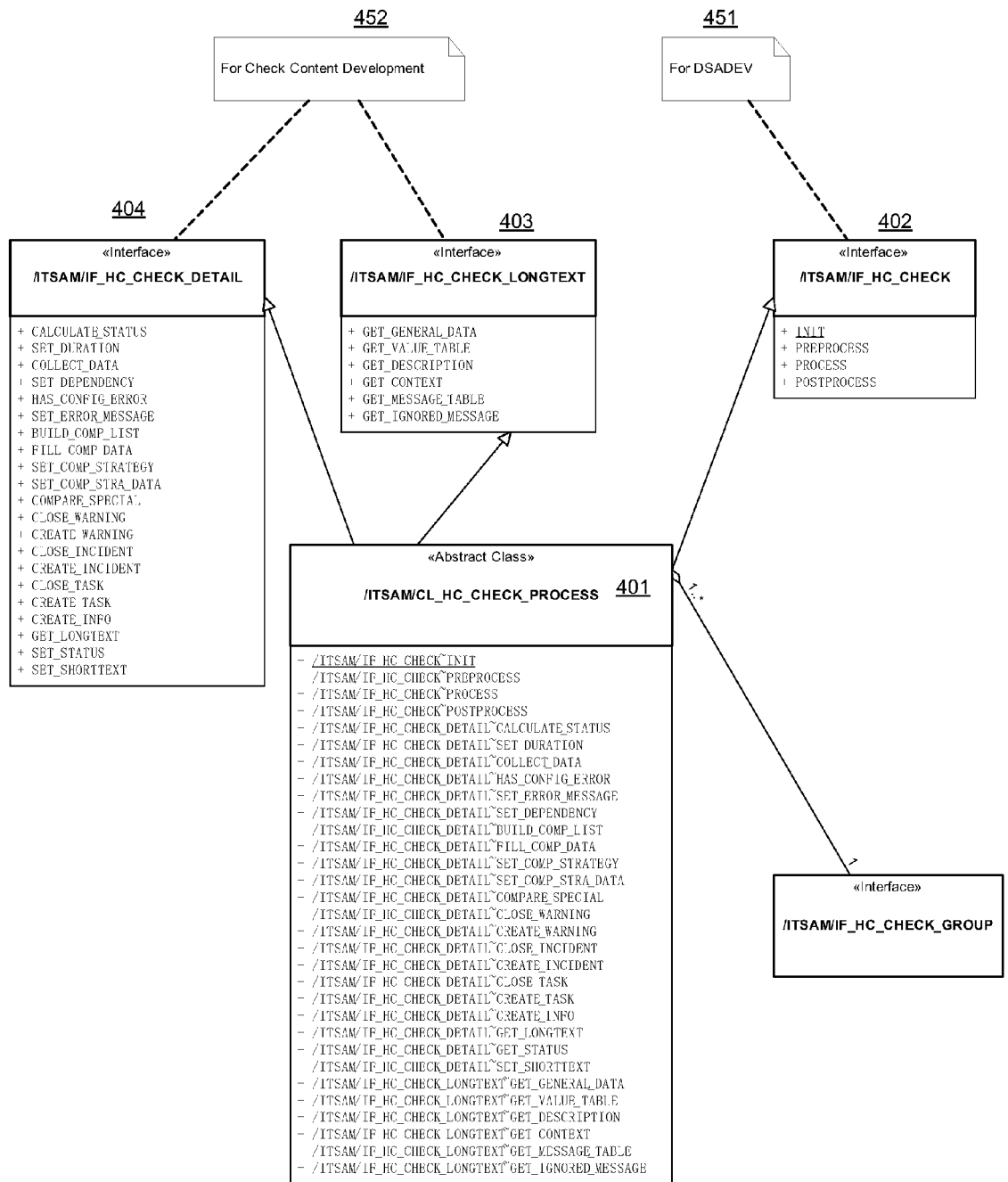

FIG. 4B is pseudo code representing an example of class structures as shown in FIG. 4A. For the purposes of consistent, certain reference numbers are maintained identical. Referring to FIG. 4B, class 401 represents a complete check process or session. Within class 401 three interfaces as classes 402-404 are implemented (e.g., inherited, overloaded, or virtualized) for different purpose. Class 402 denotes the generic check process, such as INIT, PREPROCESS, PROCESS, POSTPROCESS. It's designed to be used or invoked by an external client 451 such as service delivery layer of an ERP system (e.g., client 201 of FIG. 2). Class 404 breaks down the generic check process into details, so more small processing blocks may be implemented, such as COLLECT_DATA, HAS_CONFIG_ERROR, GET_LONGTEXT, etc. Class 404 may be used by check content development 452 (e.g., developers that are responsible for developing health check code for certain system/application components) because each processing block could differ for different checks. In addition, the processing block GET_LONGTEXT may be still too complex, thus another interface 403 is introduced to break down this complexity. Furthermore, some processing blocks have a default implementation, for example, COLLECT_DATA, because most of checks will call function module such as /SDF/CCMS_READ to get data. In a rare case that some checks do not use this function module, it can be overridden by calling another data collection function module. Other configurations may also exist.

Figure 5A:
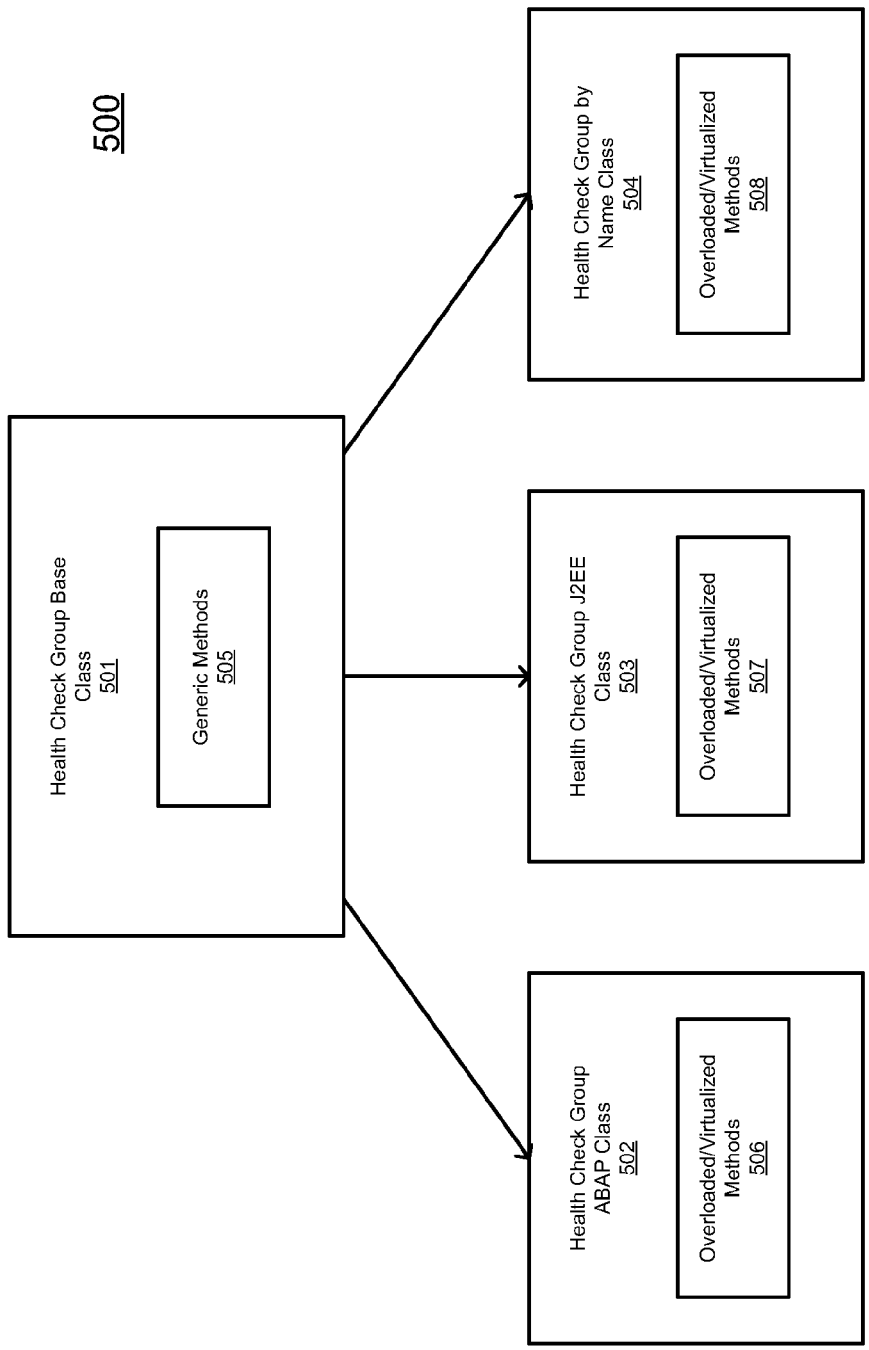
FIGS. 5A-5B are block diagrams illustrating an example of classes that define a group interface of a health check framework according to one embodiment of the invention.

FIG. 5A is a block diagram illustrating an example of classes that define a group interface of a health check framework according to one embodiment of the invention. For example, group interface 500 may be implemented as part of group interface 219 of FIG. 2. Referring to FIG. 5A, architecture 500 includes a base class 501 that defines most of the generic methods 505. According to one embodiment, certain methods are grouped and defined in different classes or objects based on certain criteria. In this example, class 502 is defined based on common methods developed by a specific tool as such ABAP available from SAP AG of Germany. Class 503 may be defined based on common methods developed by J2EE development environment. Class 504 may be defined for any other specific purpose identified via a specific group identifier. These classes 502-504 may be derived from base class 501 and may inherit, overload, or virtualize certain methods 506-508 from generic or common methods 505.

Figure 5B:
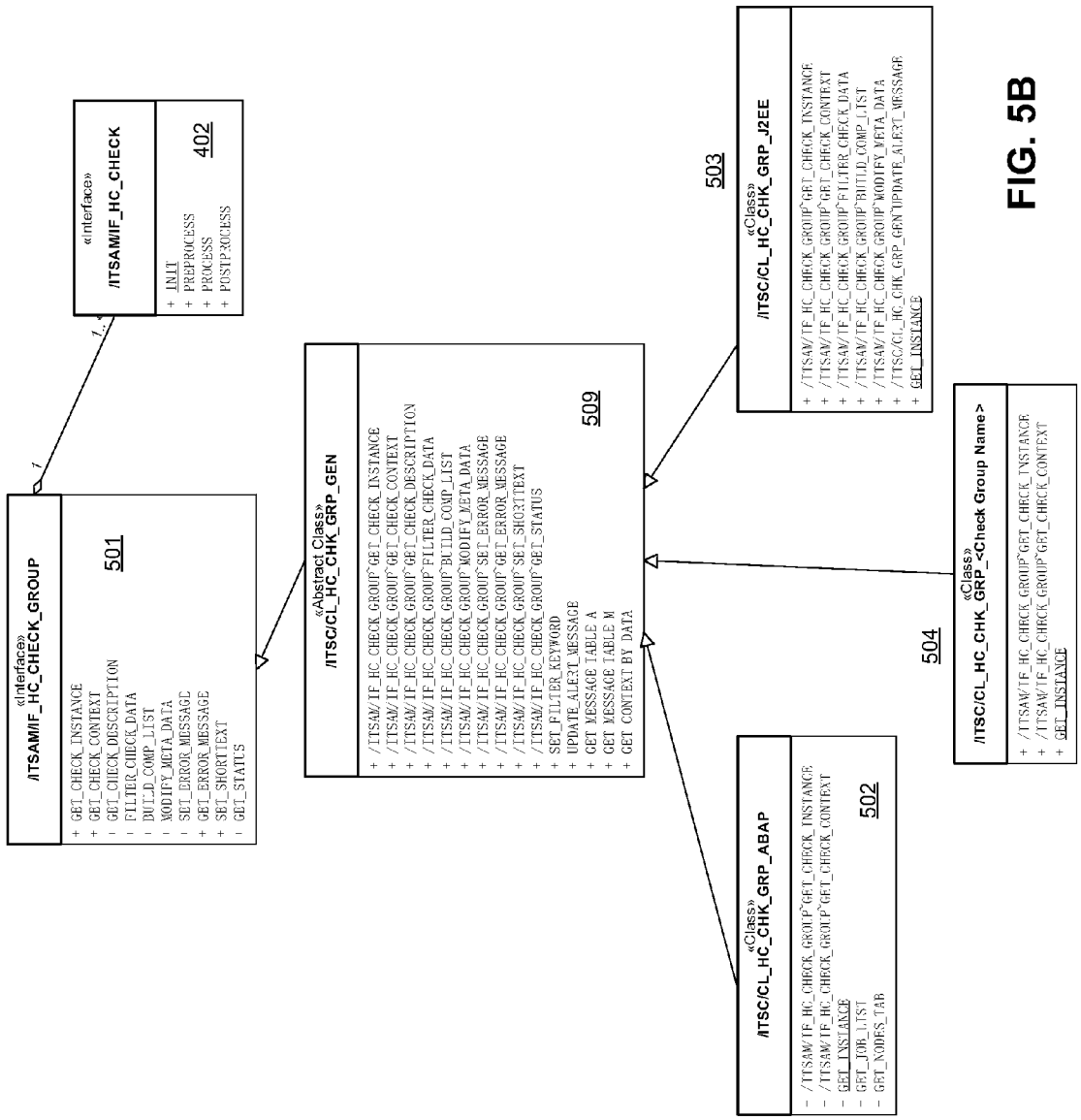

FIG. 5B is pseudo code representing an example of class structures as shown in FIG. 5A. For the purposes of consistent, certain reference numbers are maintained identical. In this example, another layer 509 of group interface may be added to include certain common methods used by different groups 502-504. According to certain embodiments of the invention, referring to FIG. 5B, in order to easily instantiate concrete checks and manage these check instances, several classes which represent all the check groups are defined, such as /ITSC/CL_HC_CHK_GRP_ABAP, /ITSC/CL_HC_CHK_GRP_J2EE, etc. All these classes are implemented as singleton via static method GET_INSTANCE. Interface /ITSAM/IF_HC_CHECK_GROUP represents the common behaviors of all these check group classes, such as GET_CHECK_INSTANCE, GET_CHECK_CONTEXT, GET_CHECK_DESCRIPTION, etc. Method GET_CHECK_INSTANCE is the central place where all check instances within this check group are initiated. All check group classes implement this interface. Each check instance is uniquely identified by a client context, client instance, check group and check ID. Some logics are shared by all check groups, so class /ITSC/CL_HC_CHK_GRP_GEN 509 is defined and serves as the base class of all check group classes. For example, GET_CHECK_DESCRIPTION, SET_SHORTTEXT, etc. Other configurations may also exist.

Figure 6:
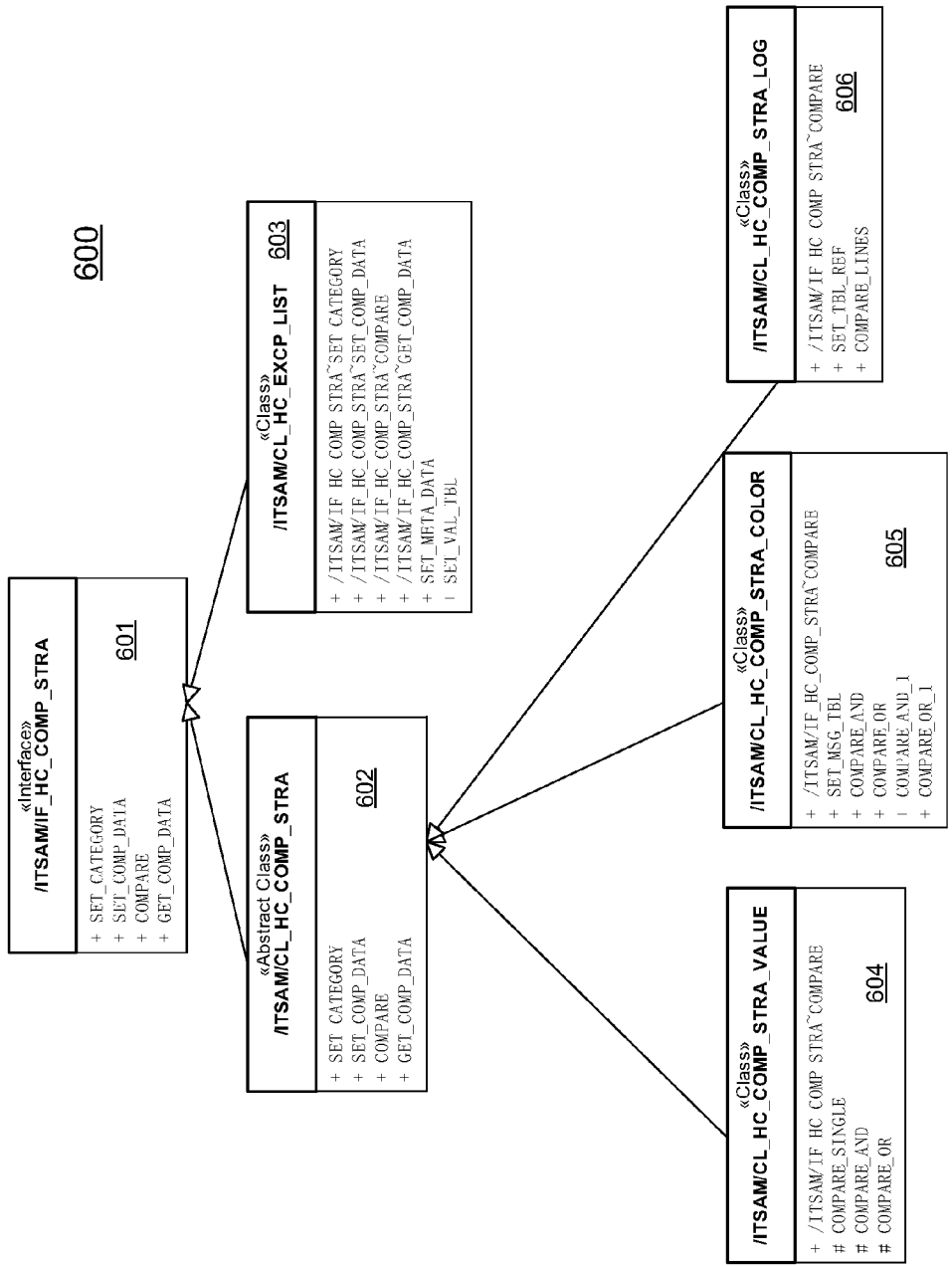
FIG. 6 is a block diagram illustrating an example of comparison logic interfaces according to one embodiment.

According to certain embodiments, the core of checks is implemented in the comparison logic which is used to create/auto-close incidents/tasks. FIG. 6 is a block diagram illustrating an example of comparison logic interfaces according to one embodiment. In order to simply the development of check content, referring to FIG. 6, multiple comparison strategy classes such as /ITSAM/CL_HC_COMP_STRA_VALUE 604, /ITSAM/CL_HC_COMP_STRA_COLOR 605, /ITSAM/CL_HC_COMP_STRA_LOG 606 are defined. The interface /ITSAM/IF_HC_COMP_STRA 601 is reused also by class /ITSAM/CL_HC_EXCP_LIST 603 which is designed for exception list handling. The class /ITSAM/CL_HC_COMP_STRA 602 is an abstract class is used for code sharing. It implements the interface above and all three comparison strategy classes are its subclasses. When developing checks, each check normally should redefine method /ITSAM/IF_HC_CHECK_DETAIL_SET_COMP_STRATEGY and tell which strategy it will use for create/auto-close incidents/tasks. In rare cases that the comparison strategy of the check is not covered by the three classes, the method /ITSAM/IF_HC_CHECK_DETAIL_COMPARE_SPECIAL have to be redefined and special comparison logic should be implemented there.

Figure 7:
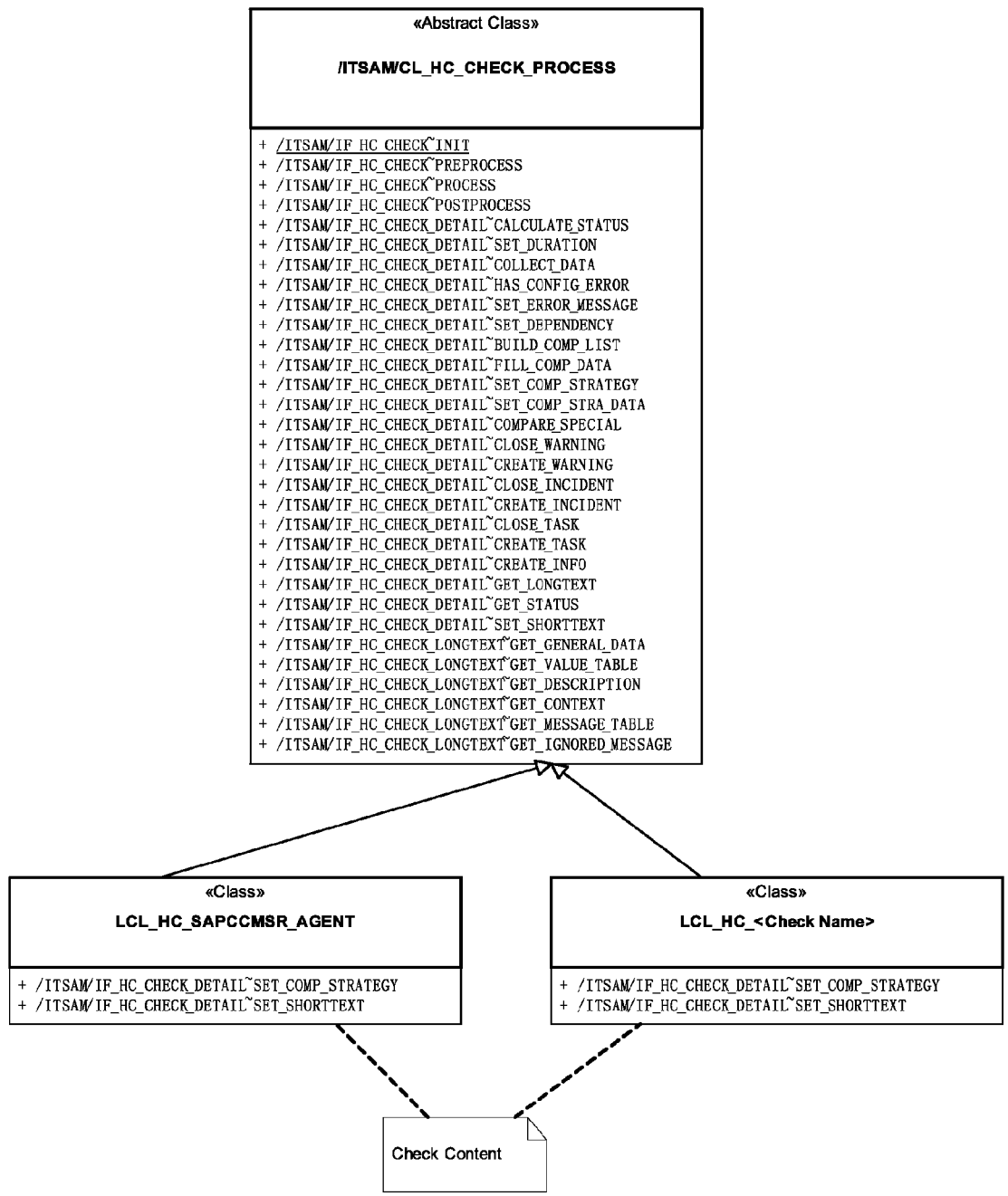
FIGS. 7-8 are block diagrams illustrating an example of classes of a health check framework according to one embodiment of the invention.

According to certain embodiments of the invention, most of the concrete checks are implemented as local class of their corresponding check group class. They all inherit from base class /ITSAM/CL_HC_CHECK_PROCESS. Normally only certain methods such as methods /ITSAM/IF_HC_CHECK_DETAIL_SET_COMP_STRATEGY and /ITSAM/IF_HC_CHECK_DETAIL_SET_SHORTTEXT may be redefined, as shown in FIG. 7.

Figure 8:
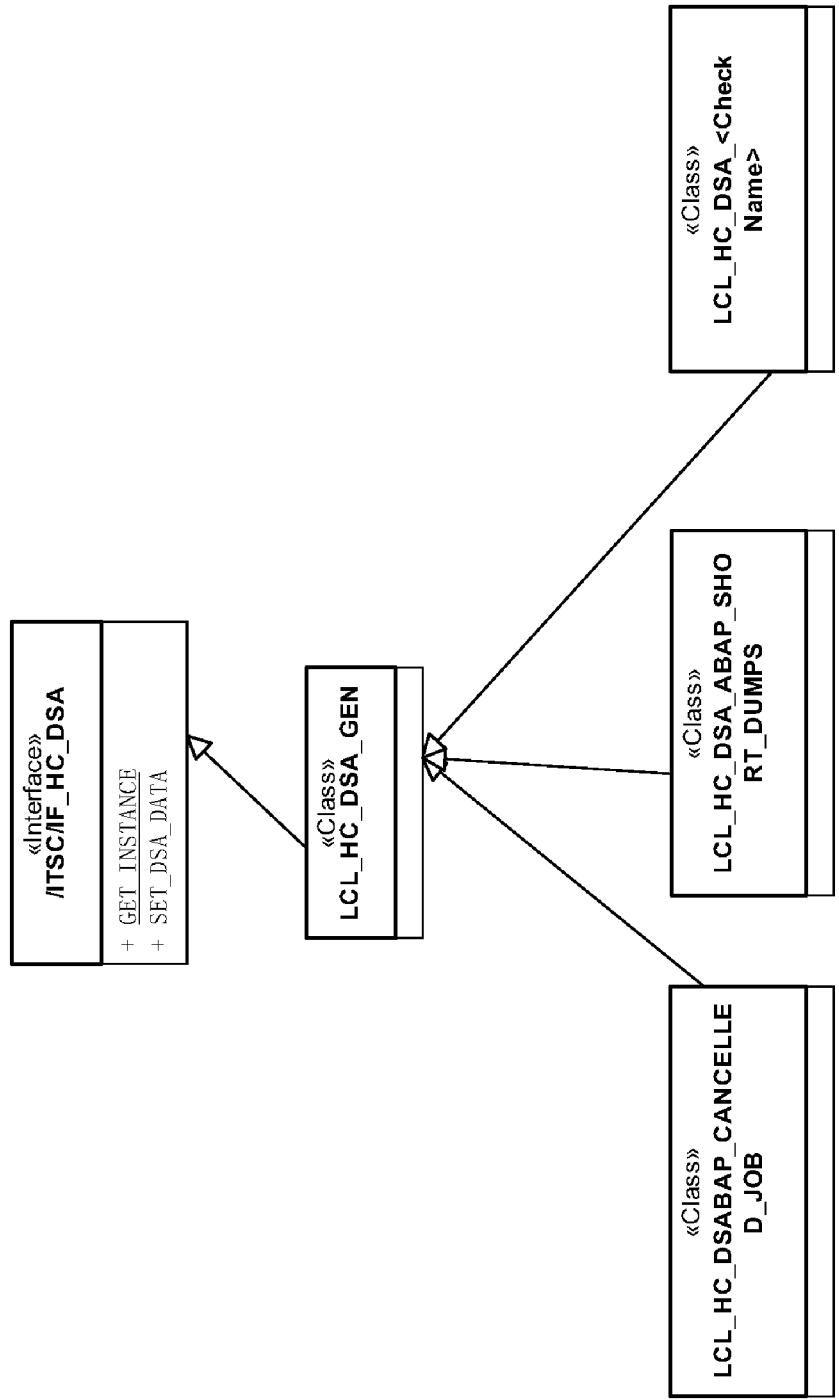

According to certain embodiments of the invention, most of the old client (e.g., DSADEV) related codes are encapsulated with class/ITSAM/CL_HC_DSA_GEN and function group /ITSC/DSA_EXT. This will help to achieve the old client decoupling and provide backward compatibility, as shown in FIG. 8. The generic DSA handling is implemented in class LCL_HC_DSA_GEN. If any check has special DSA handling logic, one local class should be created and special logic should be implemented there. The central instantiation method is LCL_HC_DSA_GEN=>/ITSC/IF_HC_DSA_GET_INSTANCE. If any check has its own DSA handling class, a developer should change the instantiation code inside this method.

Figure 9:
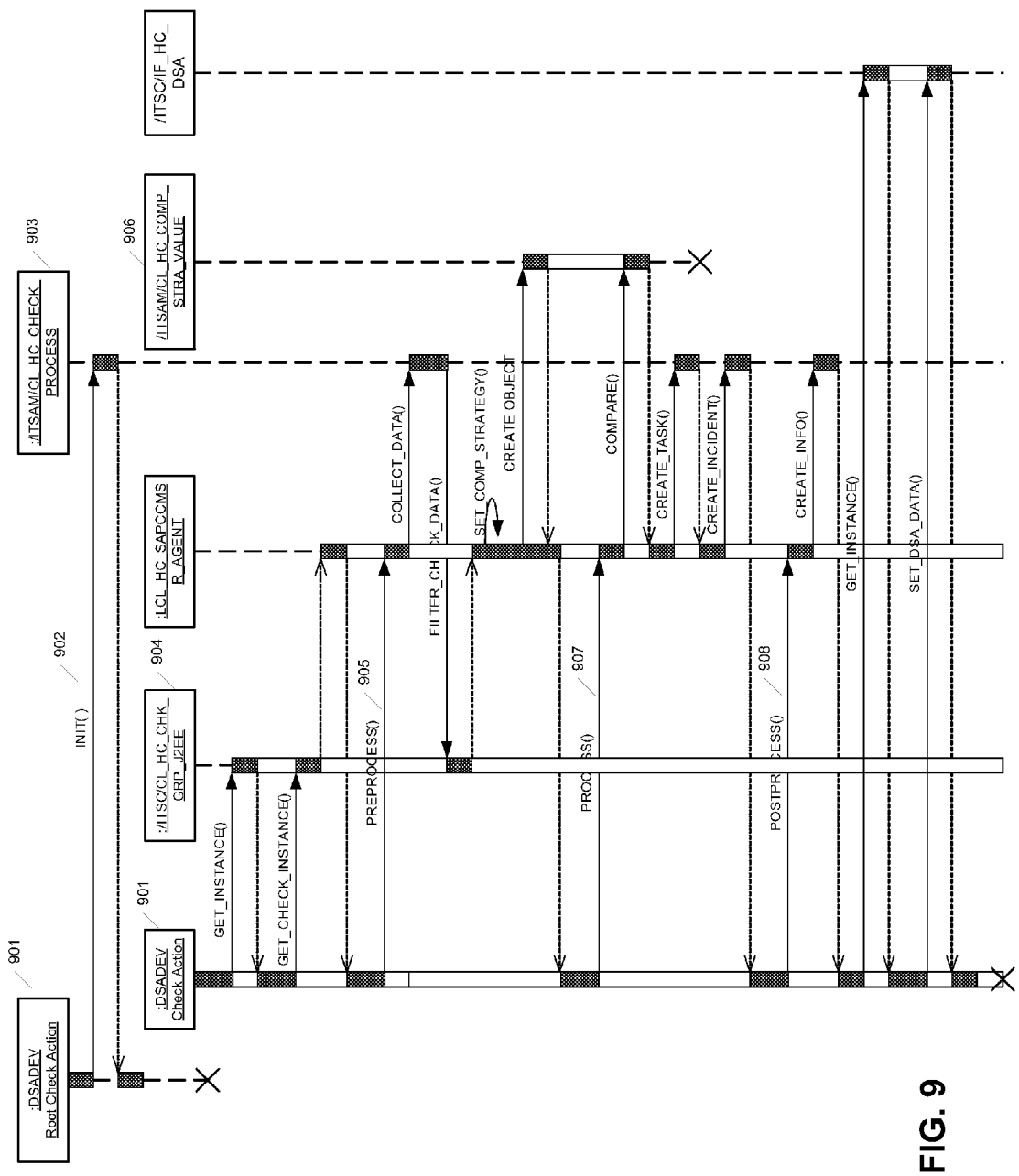
FIG. 9 is a flow diagram illustrating a process for process a health check session according to one embodiment of the invention.

FIG. 9 is a flow diagram illustrating an example of a process for a health check session according to one embodiment of the invention. Note that process 900 may be performed by processing logic which may include software, hardware, or a combination thereof. For example, process 900 may be performed by system 200 as shown in FIG. 2. Referring to FIG. 9, in this example, process 900 illustrates how an application health check client interacts with the health check framework to perform health check operations. According to one embodiment, a health check client 901 initiates a health check session by invoking an initialization method 901 of a health check framework 903. As described above, the initialization method 901 is defined as a public interface of a base class 903, as shown in FIG. 2. During the initialization stage of the health check session, certain data structures are initialized, including initializing certain health check instances of a group 904. After the initialization, client 901 initiates a preprocess stage of the health check session by invoking a preprocess method 905 of the health check framework. During the pre-process, certain data is collected for a variety of health check events that have been previously configured for the health check session, such as those as shown in FIGS. 10A-10B and 12. After the pre-process stage, client 901 initiates a process stage by invoking a process method 907 of the health check framework. During the process stage, the collected data of the health check events is compared against the corresponding thresholds using, for example, comparison logic 906 (e.g., comparison logic 217 of FIG. 2). In response to certain results of the comparison, one or more tasks and/or incidents are created. After the process stage, client 901 may finish the health check session by initiating a post-process stage by calling a postprocess method 908 of the health check framework, which may store any information from the previous stages in storage or send the information to other functions of the enterprise system such as history management unit.

Thus, as described above, the processing logic continually or periodically checks the system and application components residing in an enterprise system, and creates incidents and/or administration tasks if a critical situation is detected. Initially, an operator of an enterprise system (e.g., an IT administrator) configures the service level for enterprise system using, for example, a service level configuration user interface as described in FIGS. 10A-10B. The operator may define the schedule that a health check session is performed, e.g., constantly or periodically, such as every hour or daily.

Once the health check system has been configured, the system and application components of the enterprise system, whether decentralized or local, are monitored for the occurrence of any events (as shown in FIG. 12). An event, for example, is a change in system or application status or a system or an application performance value exceeding a threshold (as shown in FIGS. 10A-10B). Monitored events are stored and pushed to an evaluation engine (e.g., comparison logic as part of the health check framework), where the pushed events are evaluated.

The evaluation of events may include two processes. In the first process, each event can be routed based on rule logic (e.g., AND, OR, NOT AND, etc.), which, e.g., may be retrieved from a rules catalog of an integrated electronic operations hand book, which also includes other data storages, such as a task catalog and configuration data. The rules logic may include scenarios, such as "if A AND B then C," or "if A AND B, then NOT C." The rules-based classification and routing can include time dependent rules logic, such as "if A happens more than B times in C seconds, then D" or "if A happens AND NOT B happens within the next C seconds, then D." The rules logic can also include logic that classifies and routes an event based on severity and system impact, such as for an evaluation of a single event regarding its attributes in point in time. Moreover, the rules logic can include logic that classifies and routes events based on an evaluation of a single event according to the frequency of its occurrence.

For example, some events can be meaningless if they occur only once, but can indicate a severe issue if they happen more frequently, such as a performance event that occurs more often over time. The rules logic further can include logic that classifies and routes different events occurring at the same time, which may be useful to identify the actual system status. For example, if a certain server does not respond and the corresponding network link indicates a network failure, then the actual problem is more likely a network issue rather than a service problem. This information can be used in order to trigger an appropriate system analysis. The rules logic also can include logic that classifies and routes multiple events occurring over a period of time.

As an example of an event being classified and routed based on rule logic, assume a database response time exceeds a certain threshold, which causes the generation of an event. But say, e.g., the event occurs only during the night while a time-consuming batch job is running. As a result, the rules-based classification and routing process may determine that the event need not be routed for further processing. As another example, assume the database time exceeds a certain threshold several times, and the response time values increase over time during productive working hours. As a result, the rules-based classification and routing process may determine that the event needs to be routed for further processing, e.g., by the evaluation. Typically, these routed events are critical system events from the application components.

According to certain embodiments, processing logic retrieves the routed event input (e.g., response time values, file system usage, CPU usage, etc.) and determines whether the routed event should be classified as an incident or an administration task. In some implementations, additional information about the routed event may be desired and can be retrieved from the system and application components associated with the event in order to determine whether the routed event should be classified as an incident or an administration task. Based on the retrieve information, the tasks which are necessary to analyze and resolve the event are selected from, e.g., a task catalog (data storage) of an integrated electronic operations handbook, and processed to determine whether to classify the routed event as an incident or an administration task. If the tasks necessary to analyze the event are located, the event is classified as an administration task; otherwise the event is classified as an incident.

In other words, classifying the generated event as either an incident or an administration task can be based on predefined criteria, as provided by the task catalog of the integrated operations handbook. The task storage includes predefined task events and can also include other information, such as task schedules, task responsibilities, and service level agreement data. In some implementations, the task storage defines the responsible person for processing the task event. Thus, in some implementations, evaluating whether a routed event should be classified as an incident or task can be accomplished by searching the task storage of the operations handbook to determine if the routed event is listed in the operations handbook. If the generated event is not listed, then the generated event can be classified as an incident. If the generated event is listed, then the generated event can be classified as an administration task.

If the generated event is evaluated and determined to correspond to an administrative task (e.g., a configuration parameter needs to be changed according to a predefined schedule), an administration task is created and associated context data is provided with the administration task. Optionally, an administration task can be time-based triggered, e.g., periodic administration task or a combination of time-based triggered and event-based triggered. Next, the created administration task may be optionally displayed during task management.

If the generated event is evaluated and determined to correspond to an incident, an incident is created and may be optionally displayed in a service desk environment. According to one embodiment, the context (or diagnostic) data associated with the incident is automatically collected. The context or diagnostic data may include, e.g., technical and application information, that is usually required to resolve the incident. The context data can include, e.g., relevant system and application information from all architectural layers, such as a user interface layer, enterprise service layer, a business object layer and a system layer. Because the context data is automatically collected, at or near the time the event, which caused the creation of the incident, occurred, the state of the system or application components causing the incident is preserved (unlike conventional systems in which an operator may attempt to resolve the incident after the associated log files or other system or application component context information may have already been deleted).

Thereafter, an incident report is generated, which provides an explanation of the why the incident was triggered with the collected context data. Thereafter, an incident service request is generated, typically by a service desk, such as a Customer Relationship Management (CRM) system residing on an application platform within the enterprise system. In such implementations, the service desk receives the incident report, stores the report, and generates the service request. The incident service request may then be optionally displayed in a user interface so that an operator or other end user can be visually notified of the incident service request and track the status of the incident service request.

Figure 13:
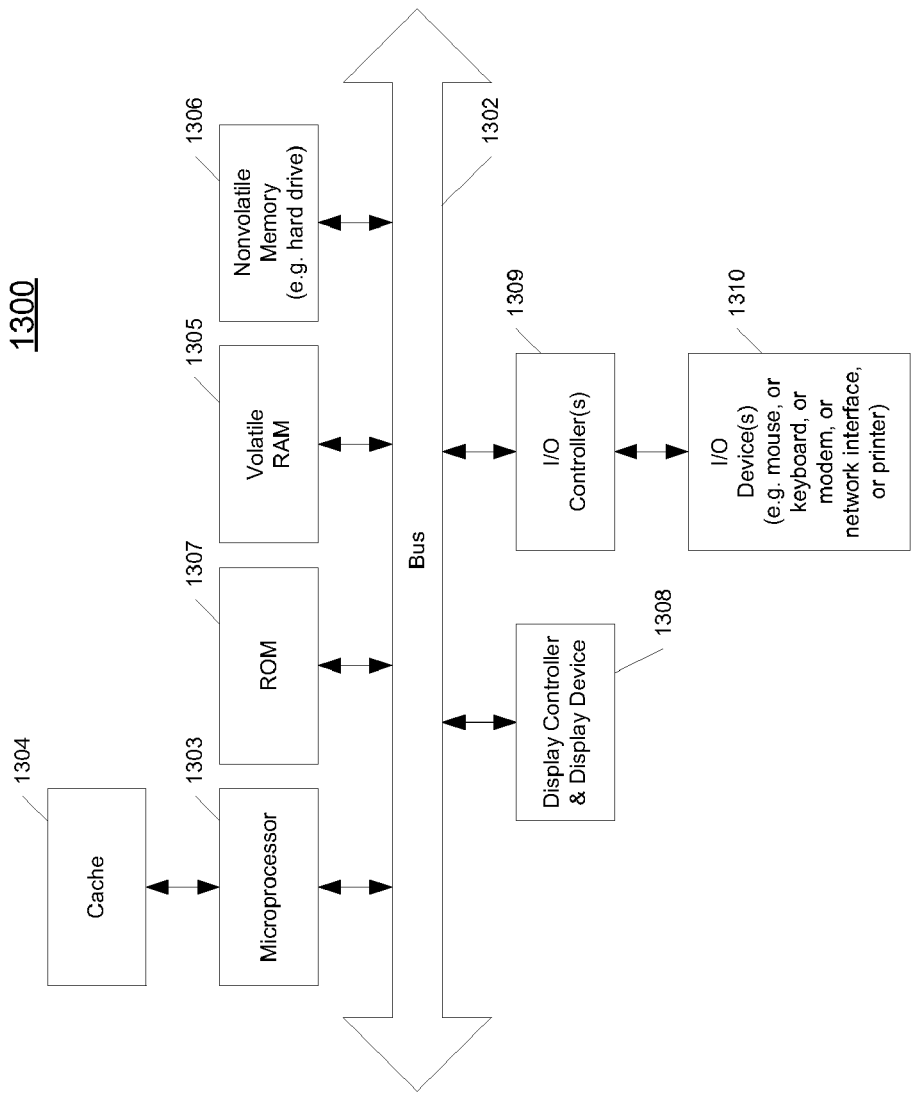
FIG. 13 is a block diagram of a data processing system which may be used with one embodiment of the invention.

FIG. 13 is a block diagram of a data processing system which may be used with one embodiment of the invention. For example, the system 1300 shown in FIG. 13 may be used as a computer system such as computer systems 101 and/or 103 of FIG. 1. Note that while FIG. 13 illustrates various components of a computer system, it is not intended to represent any particular architecture or manner of interconnecting the components; as such details are not germane to the present invention. It will also be appreciated that network computers, handheld computers, cell phones, and other data processing systems which have fewer components or perhaps more components may also be used with the present invention. The computer system of FIG. 13 may, for example, be an Apple Macintosh computer or an IBM compatible PC.

As shown in FIG. 13, the computer system 1300, which is in a form of a data processing system, includes a bus or interconnect 1302 coupled to a processor 1303 and a ROM 1307, a volatile RAM 1305, and a non-volatile memory 1306. Processor 1303 may include multiple processors and/or core logics that constitute central processing units (CPUs) of the system and thus, control the overall operations of the system. According to certain embodiments, processor 1303 accomplish this by executing software stored in any of the memories 1305-1307, such as, for example, applications and operating system, etc. Processor 1303 may include, one or more programmable general-purpose or special-purpose microprocessors, digital signal processors (DSPs), programmable controllers, application specific integrated circuits (ASICs), programmable logic devices (PLDs), or the like, or a combination of such devices.

The processor 1303, which may be, for example, an Intel processor or a PowerPC processor, is coupled to cache memory 1304 as shown in the example of FIG. 13. The bus 1302 interconnects these various components together and also interconnects these components 1303 and 1305-1307 to a display controller and display device 1308, as well as to input/output (I/O) devices 1310, which may be mice, keyboards, modems, network interfaces, printers, and other devices which are well-known in the art.

Typically, the input/output devices 1310 are coupled to the system through input/output controllers 1309. The volatile RAM 1305 is typically implemented as dynamic RAM (DRAM) which requires power continuously in order to refresh or maintain the data in the memory. The non-volatile memory 1306 is typically a magnetic hard drive, a magnetic optical drive, an optical drive, a DVD RAM, a Flash memory, or other type of memory system which maintains data even after power is removed from the system. Typically, the non-volatile memory will also be a random access memory, although this is not required.

While FIG. 13 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 1302 may include one or more buses connected to each other through various bridges, controllers, and/or adapters, as is well-known in the art. In one embodiment, the I/O controller 1309 includes a USB (Universal Serial Bus) adapter for controlling USB peripherals. Alternatively, I/O controller 1309 may include an IEEE-1394 adapter, also known as FireWire adapter, for controlling FireWire devices. Other components may also be included.

Thus, a health check framework for enterprise systems has been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for managing an enterprise system, the method comprising:
providing a plurality of first layer methods as public interfaces to allow an application client to initiate at least one of a health checking session for evaluating operation health of an enterprise system having a plurality of components, wherein the plurality of first layer methods are independent of a particular component of the enterprise system;
for each of the plurality of first layer methods, providing at least one second layer method associated with the respective each of the plurality of first layer methods to provide an abstract interface to the plurality of components with respect to the plurality of first layer methods, wherein one of the at least one second layer method includes at least a first implementation to perform health check operations of the one of the at least second layer method that are specific to a corresponding one of the plurality of components of the enterprise system and at least one other implementation specific to a corresponding another one of the plurality of components to perform the health check operations of the one of the at least second layer method, the at least first implementation and the at least one other implementation to perform the health check operations of the one of the at least second layer method being different from each other, and wherein the at least one second layer method is encapsulated in at least one object without being exposed to the application client; and
in response to a health check session initiated from the application client, at least one of the plurality of first layer methods invoking at least one of the respective at least one second layer method associated with the at least one of the plurality of first layer methods to perform at least one: collect data from the plurality of components, evaluate the collected data, and issue a status report concerning the operating health of the plurality of components of the enterprise system.

2. The method of claim 1, wherein the plurality of first layer methods comprise:
a preprocess method to invoke the at least one second layer method to collect diagnostic data concerning operational health of the plurality of components according to at least one health check event; and
a process method to invoke the at least one second layer method to evaluate the collected diagnostic data in view of thresholds of the at least one health check event and to generate an incident report for an event having diagnostic data satisfying a corresponding threshold.

3. The method of claim 2, wherein the plurality of first layer methods further comprise:

an initialization method to invoke at least one of the at least one second layer method to initialize internal at least one data structure used during the health check session; and
a post-process method to store the collected diagnostic data and incident report in a storage for history management purposes.

4. The method of claim 3, further comprising:
defining the plurality of first layer methods via a base class including at least one common function member; and
defining the at least one second layer method via at least one derived class derived from the base class and encapsulated in the base class.

5. The method of claim 4, wherein the at least one second layer method is defined in a corresponding derived class by performing at least one of: overloading and virtualizing at least one common function member of the base class.

6. The method of claim 5, further comprising providing at least one third layer method to handle health check queries having a long text format, wherein the at least one third layer method is defined in a separate class corresponding to the long text format, wherein the at least one third layer method is invoked from at least one of the plurality of first layer methods.

7. The method of claim 6, further comprising providing at least one fourth layer method for comparing data, each of the at least one fourth layer method associated with a specific type of data to be compared, including at least one of comparison based on values, comparison based on colors, and comparison based on log information.

8. The method of claim 3, further comprising providing get instance method to retrieve all instances of health check items associated with one of a plurality of groups, each of the health check items being identified by a specific health check instance, wherein each group being associated with a specific programming environment.

9. A machine-readable storage medium having executable instructions stored therein, which when executed by a machine, cause the machine to perform a method for managing an enterprise system, the method comprising:
providing a plurality of first layer methods as public interfaces to allow an application client to initiate at least one stage of a health checking session for evaluating operation health of an enterprise system having a plurality of components, wherein the plurality of first layer methods are independent of a particular component of the enterprise system;
for each of the plurality of first layer methods, providing at least one second layer method associated with the respective each of the plurality of first layer methods to provide an abstract interface to the plurality of components with respect to the plurality of first layer methods, wherein one of the at least one second layer method includes at least a first implementation to perform health check operations of the one of the at least second layer method that are specific to a corresponding one of the plurality of components of the enterprise system and at least one other implementation specific to a corresponding another one of the plurality of components to perform the health check operations of the one of the at least second layer method, the at least first implementation and the at least one other implementation to perform the health check operations of the one of the at least second layer method being different from each other, and wherein the at least one second layer method is encapsulated in at least one object without being exposed to the application client; and in response to a health check session initiated from the application client, at least one of the plurality of first layer methods invoking at least one of the respective at least one second layer method associated with the at least one of the plurality of first layer methods to perform at least one of: collect data from the plurality of components, evaluate the collected data, and issue a status report concerning the operating health of the plurality of components of the enterprise system.

10. The machine-readable storage medium of claim 9, wherein the plurality of first layer methods comprise:
a preprocess method to invoke the at least one second layer method to collect diagnostic data concerning operational health of the plurality of components according to health check event; and
a process method to invoke the at least one second layer method to evaluate the collected diagnostic data in view of thresholds of the at least one health check event and to generate an incident report for an event having diagnostic data satisfying a corresponding threshold.

11. The machine-readable storage medium of claim 10, wherein the plurality of first layer methods further comprise:
an initialization method to invoke at least one of the at least one second layer method to initialize internal at least one data structure used during the health check session; and
a post-process method to store the collected diagnostic data and incident report in a storage for history management purposes.

12. The machine-readable storage medium of claim 11, wherein the method further comprises:
defining the plurality of first layer methods via a base class including at least one common function member; and
defining the at least one second layer method via at least one derived class derived from the base class and encapsulated in the base class.

13. The machine-readable storage medium of claim 12, wherein the at least one second layer method is defined in a corresponding derived class by performing at least one of: overloading and virtualizing at least one common function member of the base class.

14. The machine-readable storage medium of claim 13, wherein the method further comprises providing at least one third layer method to handle health check queries having a long text format, wherein the at least one third layer method is defined in a separate class corresponding to the long text format, wherein the at least one third layer method is invoked from at least one of the plurality of first layer methods.

15. The machine-readable storage medium of claim 14, wherein the method further comprises providing at least one fourth layer method for comparing data, each of the at least one fourth layer method associated with a specific type of data to be compared, including at least one of comparison based on values, comparison based on colors, and comparison based on log information.

16. The machine-readable storage medium of claim 11, wherein the method further comprises providing get instance method to retrieve all instances of health check items associated with one of a plurality of groups, each of the health check items being identified by a specific health check instance, wherein each group being associated with a specific programming environment.

17. An enterprise computing system, comprising:
a plurality of components, each operable to perform at least one task associated with operations of an enterprise entity; and
a health check framework configured to perform health check operations regarding health status of the plurality of components, wherein the health check framework, when invoked, is configured to
provide a plurality of first layer methods as public interfaces to allow an application client to initiate at least one stage of a health checking session for evaluating operation health of an enterprise system having the plurality of components, wherein the plurality of first layer methods are independent of a particular component of the enterprise system,
for each of the plurality of first layer methods, provide at least one second layer method associated with the respective each of the plurality of first layer methods to provide an abstract interface to the plurality of components with respect to the plurality of first layer methods, wherein one of the at least one second layer method includes at least a first implementation to perform health check operations of the one of the at least second layer method that are specific to a corresponding one of the plurality of components of the enterprise system and at least one other implementation specific to a corresponding another one of the plurality of components to perform the health check operations of the one of the at least second layer method, the at least first implementation and the at least one other implementation to perform the health check operations of the one of the at least second layer method being different from each other, and wherein the at least one second layer method is encapsulated in at least one object without being exposed to the application client, and
wherein in response to a health check session initiated from the application client, at least one of the plurality of first layer methods invokes at least one of the respective at least one second layer method associated with the at least one of the plurality of first layer methods to perform at least one of: collect data from the plurality of components, evaluate the collected data, and issue a status report concerning the operating health of the plurality of components of the enterprise system.

18. The system of claim 17, wherein the plurality of first layer methods comprise:
a preprocess method to invoke the at least one second layer method to collect diagnostic data concerning operational health of the plurality of components according to at least one health check event; and
a process method to invoke the at least one second layer method to evaluate the collected diagnostic data in view of thresholds of the at least one health check event and to generate an incident report for an event having diagnostic data satisfying a corresponding threshold.

19. The system of claim 18, wherein the plurality of first layer methods further comprise: an initialization method to invoke at least one of the at least one second layer method to initialize
internal at least one data structure used during the health check session; and
a post-process method to store the collected diagnostic data and incident report in a storage for history management purposes.

20. The system of claim 19, wherein the plurality of first layer methods are defined via a base class including at least one common function member, and wherein the at least one second layer method is defined via at least one derived class derived from the base class and encapsulated in the base class.

* * * * *